US008292314B1

(12) United States Patent
Schaal et al.

(10) Patent No.: US 8,292,314 B1
(45) Date of Patent: Oct. 23, 2012

(54) CUSTOMIZED WHEELCHAIR AND METHOD OF OPERATION

(76) Inventors: Kyle W. Schaal, Irvine, CA (US); Neil A. H. Hudson, Irvine, CA (US); William W. Schaal, Irvine, CA (US)

( * ) Notice: Subject to any disclaimer, the term of this patent is extended or adjusted under 35 U.S.C. 154(b) by 0 days.

(21) Appl. No.: 13/074,872

(22) Filed: Mar. 29, 2011

(51) Int. Cl.

| | |
|---|---|
| ***A61G 5/02*** | (2006.01) |
| ***A61G 5/10*** | (2006.01) |
| ***B62M 1/14*** | (2006.01) |

(52) U.S. Cl. ................................ 280/250.1; 280/304.1

(58) Field of Classification Search .................. 180/907; 280/250.1, 288.4, 304.1
See application file for complete search history.

(56) References Cited

U.S. PATENT DOCUMENTS

| | | | | | |
|---|---|---|---|---|---|
| 4,257,545 | A | * | 3/1981 | Rhyan | 224/407 |
| 4,428,616 | A | * | 1/1984 | Hamilton | 297/145 |
| 4,449,750 | A | * | 5/1984 | Pultman | 312/235.2 |
| 4,489,981 | A | | 12/1984 | Goletski | |
| 4,526,419 | A | * | 7/1985 | Bowman et al. | 297/153 |
| 4,538,857 | A | | 9/1985 | Engman | |
| 4,580,803 | A | * | 4/1986 | Davis | 280/304.1 |
| 4,632,451 | A | * | 12/1986 | Lee | 297/153 |
| 4,813,693 | A | * | 3/1989 | Lockard et al. | 280/42 |
| 4,815,688 | A | * | 3/1989 | Wood | 248/230.2 |
| 5,050,899 | A | * | 9/1991 | Stensby | 280/250.1 |
| 5,139,309 | A | * | 8/1992 | Kornreich | 297/162 |
| 5,154,331 | A | * | 10/1992 | Sanders | 224/407 |
| 5,156,226 | A | * | 10/1992 | Boyer et al. | 180/65.1 |
| 5,242,138 | A | * | 9/1993 | Kornberg | 248/118 |
| 5,259,664 | A | | 11/1993 | Cottle | |
| 5,333,929 | A | | 8/1994 | Slagerman | |
| 5,356,059 | A | * | 10/1994 | Yanez et al. | 224/407 |
| 5,588,663 | A | | 12/1996 | Rundle et al. | |
| 6,375,209 | B1 | * | 4/2002 | Schlangen | 280/250.1 |
| 7,052,023 | B2 | * | 5/2006 | Chen et al. | 280/47.38 |
| 7,500,689 | B2 | * | 3/2009 | Pasternak et al. | 280/304.1 |
| 7,866,613 | B2 | * | 1/2011 | Cramer | 248/118 |
| D632,930 | S | * | 2/2011 | Chretien | D7/620 |
| 2008/0041282 | A1 | * | 2/2008 | Goschy et al. | 108/141 |
| 2008/0309051 | A1 | * | 12/2008 | Elflein | 280/304.1 |
| 2009/0224121 | A1 | * | 9/2009 | Cramer | 248/231.85 |

OTHER PUBLICATIONS

1800WHEELCHAIR.com; Transport Wheelchairs—Transport Chairs—1-800-Wheelchair.com; http://www.1800wheelchair.com/category/369/transport-wheelchairs[Dec. 2, 2010 9:07:21 PM]; 2 pages.

Preferred Health Choice—Mobility & Patient Aid Center; Invacare® Wheelchairs—Invacare Manual Wheelchairs; http://www.phc-online.com/Invacare_Wheelchairs_s/7662.htm[Dec. 2, 2010 9:09:51 PM] 6 pages.

1800WHEELCHAIR.com; Discount Manual Wheelchairs For Sale—1800wheelchair.com; http://www.1800wheelchair.com/asp/view-category-subcats.asp?category_id=297[Dec. 2, 2010 9:07:56 PM] 3 pages.

* cited by examiner

*Primary Examiner* — Tashiana Adams
*Assistant Examiner* — Marc Scharich
(74) *Attorney, Agent, or Firm* — Blakely, Sokoloff, Taylor & Zafman LLP

(57) ABSTRACT

According to an embodiment of the invention, a customized wheelchair comprises a frame, a plurality of wheels, and a pair of adjustable armrests. The armrests are coupled to the frame. At least a first armrest of the pair of adjustable armrests comprises a horizontal tubular section that is adapted to be (i) maintained at a first predetermined height when placed in a first operating state and (ii) maintained at a second predetermined height higher than the first predetermined height when placed in a second operating state. To customize the wheelchair, an accessory is provided that can be removably coupled to the horizontal tubular section of the first armrest of the pair of adjustable armrests.

19 Claims, 3 Drawing Sheets

CUSTOMIZED WHEELCHAIR AND METHOD OF OPERATION

FIELD

Embodiments of the invention relate to the field of disability equipment. More specifically, one embodiment of the invention relates to a customized wheelchair.

GENERAL BACKGROUND

Throughout the United States and worldwide, people of various ages experience illnesses and injuries that are severely debilitating. Unfortunately, some of these people need to use a wheelchair for a prolonged period of time. Depending on the injury or illness, this period of time may range from a few weeks to a few months, or even longer.

Currently, conventional wheelchairs are standardized in construction and do not take into account persons of different sizes. Moreover, wheelchairs cannot be easily adapted with accessories that would be highly valued by the ill or injured user and would provide welcomed comforts.

Therefore, there is a need to provide a wheelchair that can be customized for the operator and provide a variety of accessories that different users may value.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
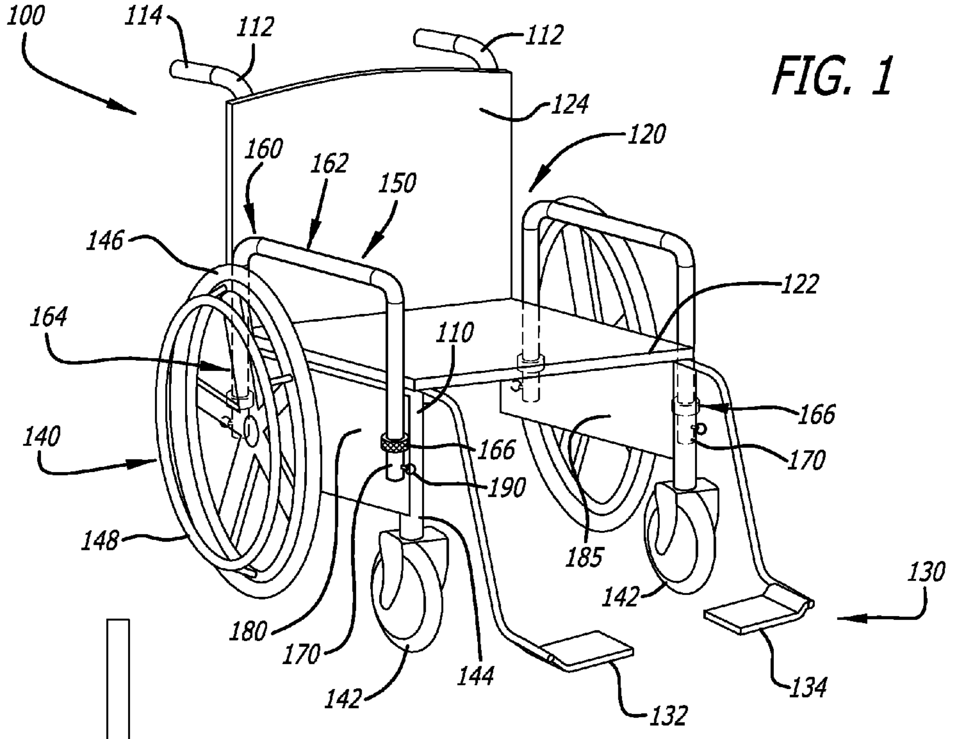
FIG. 1 is an exemplary embodiment of a customized wheelchair.

Various embodiments of the invention relate to a customized wheelchair and a method for adjusting features of the wheelchair to suit its operator.

In the following description, certain terminology is used to describe features of the invention. For instance, the term "wheelchair" may refer to any single-operator device that is adapted as a conveyance without reliance on movement of the operator's legs. The term "mechanism" generally refers to one or more mechanical components that provide certain functionality.

While this invention is susceptible to embodiments of many different forms, there is shown in the drawings and will herein be described in detail specific embodiments, with the understanding that the present disclosure is to be considered as an example of the principles of the invention and not intended to limit the invention to the specific embodiments shown and described.

I. General Overview

A customized wheelchair is described herein. The customized wheelchair comprises an adjustable armrest and/or back support member that can be positioned to suit the size and preferences of its operator. Furthermore, in lieu of being welded to the armrests, the armrest pads are removable. This allows a variety of accessories to be attached to the armrests in lieu of (or in addition to) the armrest pads. Examples of these accessories may include, but are not limited or restricted to a desk, a cup holder, a basket, a battery operated reading lamp, and the like.

II. General Architecture

Referring to FIG. 1, an exemplary embodiment of a customized wheelchair 100 is shown. Wheelchair 100 comprises a frame 110 made of a rigid material (e.g., metal, hardened plastic, etc.) that is adapted with a seat mechanism 120, a foot support mechanism 130, a conveyance mechanism 140 and a pair of armrests 150.

More specifically, seat mechanism 120 comprises a generally horizontal seat cushion 122 and a backrest 124. Seat cushion 122 is made of compliant material that provides a sitting area for the operator and supports his/her body weight. Positioned between upright push handle bracket tubes 112 located at the rear of frame 110, backrest 124 operates as a support structure while the operator is seated.

It is contemplated that push handle bracket tubes 112 may be adjustable and implemented with the same telescopic construction as the armrests 150 described below. This would enable push handles 114 to be raised or lowered dependent on the size of the person pushing wheelchair 100.

Referring still to FIG. 1, foot support mechanism 130 comprises a pair of foot rests 132 and 134 that provide a platform onto which the operator may rest his/her feet. Each of these foot rests 132 and 134 is coupled to frame 110 via a hinge (not shown) to allow foot rests 132 and 134 to be pivoted laterally. As a result, the operator can more easily exit wheelchair 100.

As further shown in FIG. 1, frame 110 is adapted with conveyance mechanism 140, namely a plurality of wheels including a pair of caster wheels 142 located under seating mechanism 120 and a pair of operator-controlled rear wheels 146. According to one embodiment of the invention, each caster wheel 142 is coupled to a corresponding caster housing 144, namely a tubular extension of frame 110. The caster housings 144 are filled with ball bearings and enable caster wheels 142 to rotate in a 360° rotation.

Coupled to frame 110 by an axle and axle plate (not shown), rear wheels 146 are pneumatic, semi-pneumatic or rubber wheels substantially larger in diameter than caster wheels 142. Each rear wheel 146 features a hand rim 148 attached to the outside periphery of rear wheels 146. Hand rim 148 provides a surface against which the operator pushes with his/her hand to propel the chair in a forward direction. Normally, hand rim 148 is made of a strong, light-weight material such as aluminum for example.

As further shown in FIG. 1, in lieu of having welded armrest pads that are permanently affixed, armrest 150 comprises a generally U-shaped arm portion 160 that extends above seat cushion 122. Arm portion 160 is a tubular component that features a horizontal segment 162 sized to support an armrest pad (not shown). The end portions 164 and 166 of armrest 150 are inserted into receivers 170, which are affixed to an outer side of panels 180 and 185 that are coupled to frame 110. A locking pin 190 is used to secure the end portions 164 and 166 of arm portion 160 so that they remain within the recessed interior of receivers 170.

Figure 2:
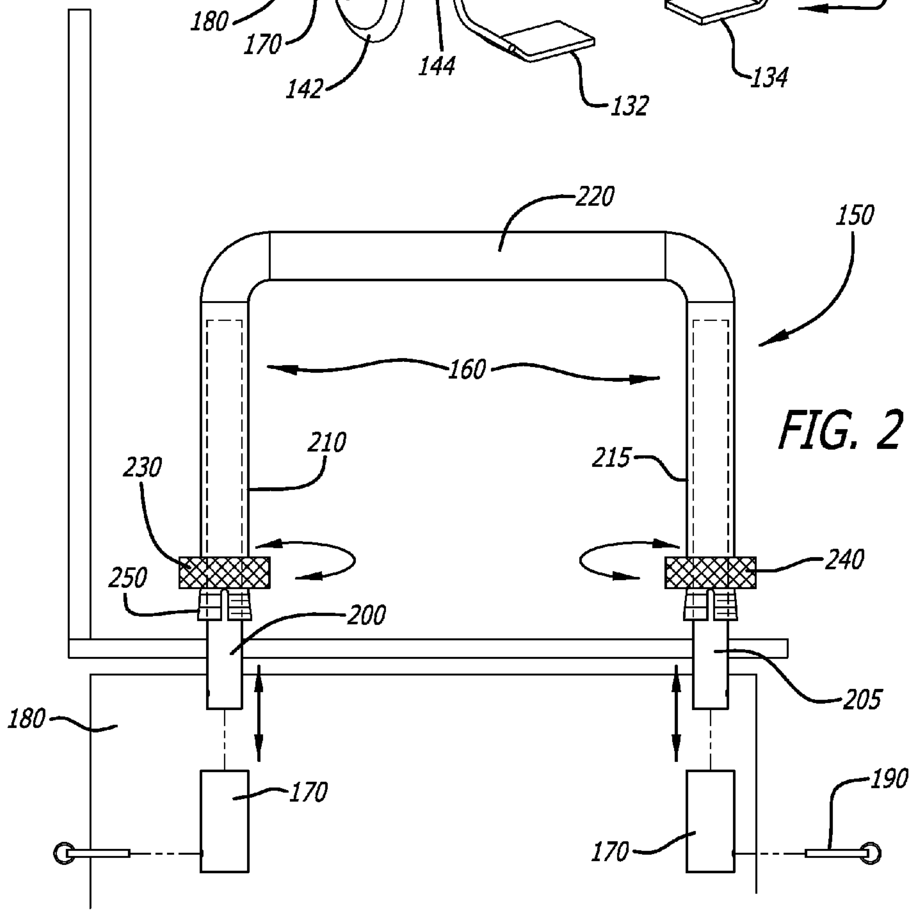
FIG. 2 is an exemplary embodiment of an adjustable armrest for the customized wheelchair of FIG. 1.

Referring now to FIG. 2, an exemplary embodiment of adjustable armrest 150 for the customized wheelchair 100 of FIG. 1 is shown. Herein, adjustable armrest 150 comprises the following: a first post 200; a second post 205; a first tubular segment 210, a second tubular segment 215 and a horizontal segment 220 forming the U-shaped arm portion 160; a first fastener 230; and a second fastener 240.

Herein, as shown for illustration in FIG. 2, first post 200 is adapted to partially reside within first tubular segment 210 of arm portion 160. Similarly, a second post 205 is adapted to partially reside within second tubular segment 215 of arm portion 160.

According to this embodiment of the invention, both posts 200 and 205 are sized so that armrest 150 is telescopic in nature; namely, greater amounts of surface area for posts 200 and 205 are exposed outside tubular segments 210 and 215 upon raising horizontal segment 220 of the arm portion 160 upward. Similarly, lesser amounts of surface area for posts 200 and 215 are exposed upon lowering horizontal segment 220 downward toward seat cushion 122.

As shown, for illustrative purposes, adjustable armrest 150 comprises the U-shaped arm portion 160 with posts 200 and 205 sized to fit within a diameter of tubular segments 210 and 215 forming the ends of arm portion 160. According to this embodiment, when fasteners 230 and 240 are placed into a first operating state, posts 200 and 205 are moveable so that arm portion 160 can be raised or lowered to suit the size of the operator.

Once the height of arm portion 160 is determined, namely the combined height formed by the exposed length of post 200/205 and tubular segments 210/215, fasteners 230 and 240 may be placed into a second operating state. When placed in the second operating state, fasteners 230 and 240 preclude vertical movement of arm portion 160 since (i) tubular segments 210/215 are secured to posts 200/205 and (ii) posts 200/205 are secured by receivers 170.

In other words, when fasteners 230 and 240 are placed into the second operating state, the first fastener 230 retains the positioning of the first post 200 with respect to the first tubular segment 210. Similarly, the second fastener 240 retains the positioning of the second post 205 with respect to the second tubular segment 215.

According to this embodiment of the invention, when fastener 230 rotated in a clockwise direction over a threaded portion 250, a force is applied against the surface of posts 200 and 205. This force causes the post 200 to be fixed in relation to tubular segment 210. However, when fastener 230 is rotated in a counter-clockwise direction, a lesser or no force is applied against a surface of post 200. This allows vertical movement of post 200 within tubular segment 210.

Figure 3:
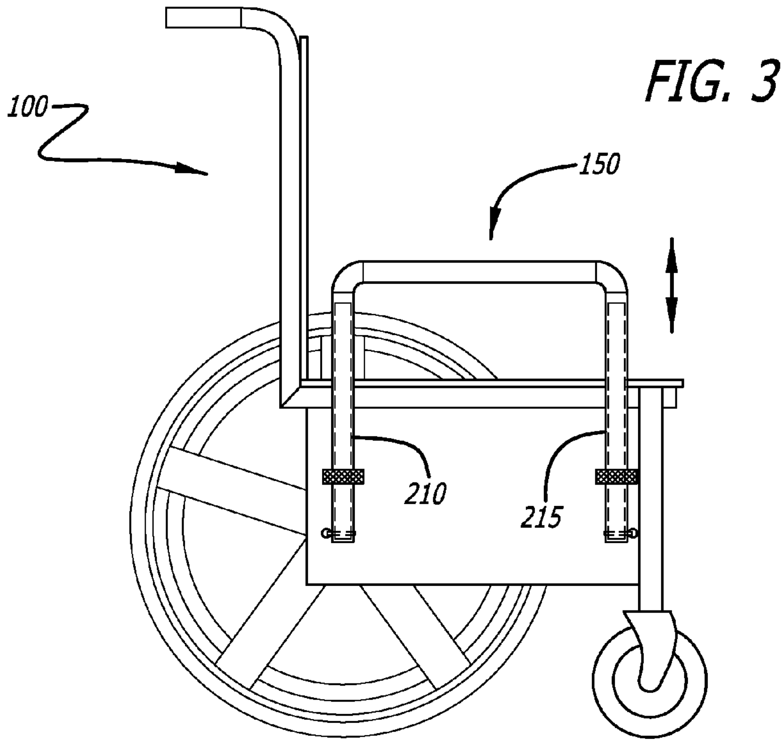
FIG. 3 is a perspective side view of the customized wheelchair of FIG. 1 with the adjustable armrest placed in a lowered position.

Referring now to FIG. 3, a perspective side view of adjustable armrest 150 in a lowered position for customized wheelchair 100 is shown. Herein, posts 200 and 205 (represented by dashed lines) are contained within a substantial portion of tubular segments 210 and 215, respectively. As a result, given it telescopic construction, armrest 150 is in a lowered position.

Figure 4:
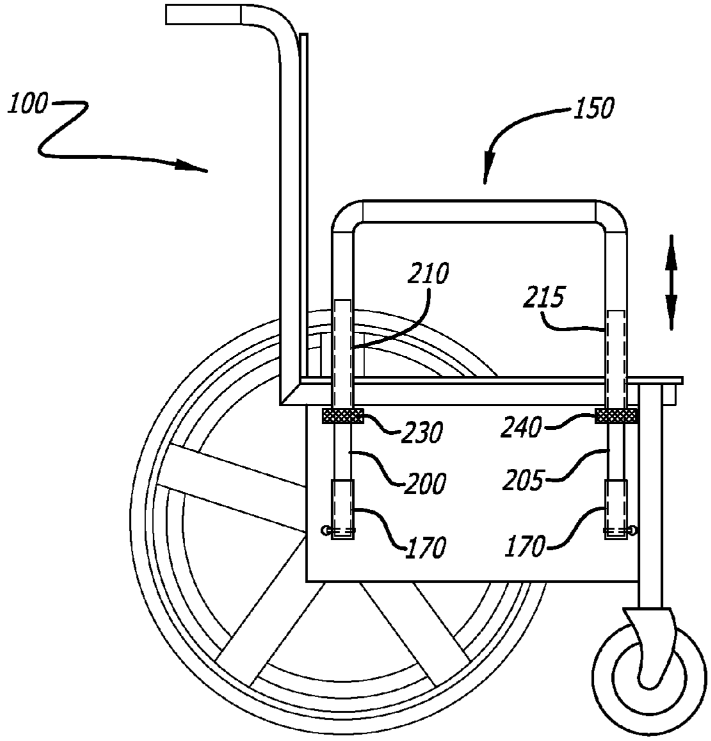
FIG. 4 is a perspective side view of the customized wheelchair of FIG. 1 with the adjustable armrest placed in a raised position.

Referring to FIG. 4, a perspective side view of adjustable armrest 150 in a raised position for customized wheelchair 100 is shown. Herein, posts 200 and 205 are partially exposed between receivers 170 and fasteners 230 and 240, respectively. This additional height increases the overall height of armrest 150 above seat cushion 122.

Of course, it is contemplated that fasteners 230 and 240 may be implemented in accordance with a variety of configurations. For instance, as shown, fasteners 230 and 240 may be implemented so that, when rotated in the correct direction, forces are applied against any structure within tubular segments 210 and 215. Another configuration may be used in which fasteners 230 and 240 are lever operable for tightening purposes. Such tightening precludes posts 200 and 205 from moving into or out from tubular segments 210 and 215.

Figure 5:
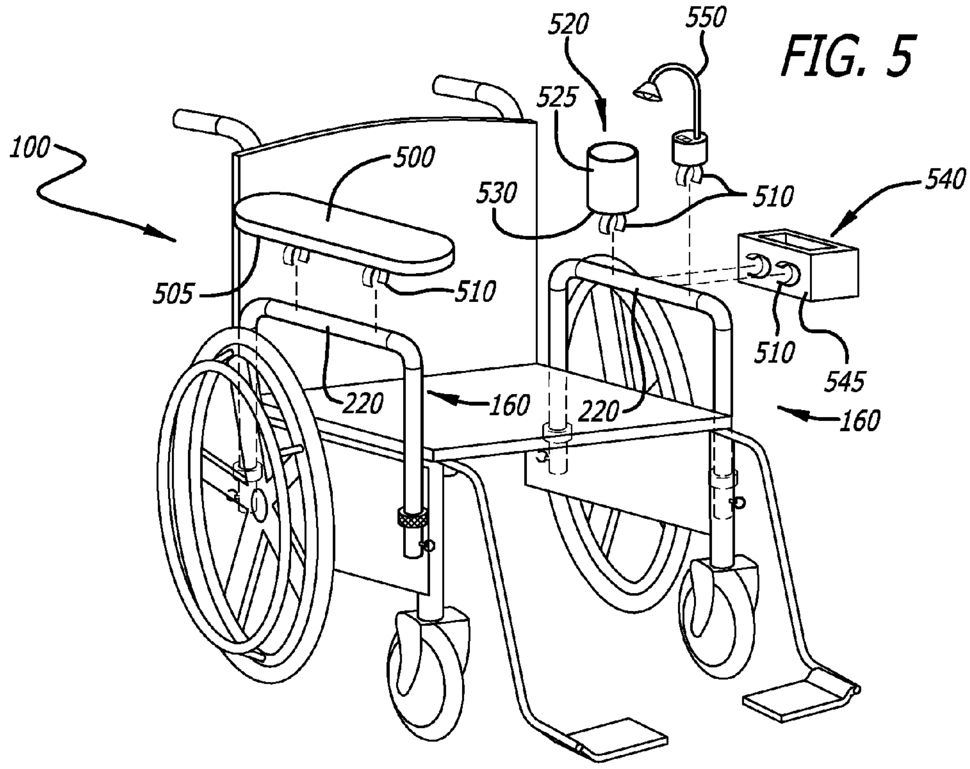
FIG. 5 is an exemplary embodiment of the customized wheelchair featuring a variety of removable accessories.

Referring now to FIG. 5, an exemplary embodiment of customized wheelchair 100 featuring a variety of removable accessories is shown. Herein, a first accessory is an armrest pad 500. Armrest pad 500 comprises one or more clips 510 situated on its bottom surface 505. These clips 510 are sized to mate with arm portion 160 (e.g., horizontal segment 220 of arm portion 160), and thereby, secure the armrest pad 500 to the arm portion 160.

A second illustrative accessory is a cup-holder 520 that comprises a recessed area 525 to receive a beverage container (e.g., cup, can, bottle, etc.) and one or more clips 510 positioned on its bottom surface 530. These clips 510 are sized to mate with arm portion 160 to secure cup-holder 520 to arm portion 160.

It is contemplated that, for one embodiment, cup-holder 520 may be made of a semi-rigid material (e.g., plastic) with optional covering of an elastic material (e.g. neoprene). Of course, cup-holder may be made from a variety of materials, provided that recessed area 525 maintains generally the same structure.

A third illustrative accessory is a basket 540 that features a recessed area into which items may be held. According to this embodiment of the invention, one or more clips 510 may be placed on a side 545 of basket 540 to provide unobstructed access to basket 540. As shown, clips 510 are sized to mate and secure basket 540 to the horizontal segment 220 of arm portion 160. Also, a reading light 550 may be positioned attached to the horizontal section 220.

It is contemplated that the cross-sectional area of the tubular members forming at least horizontal segment 220 of arm portion 160 may be non-circular. This would mitigate unwanted rotation of the accessories after being attached to horizontal segment 220.

Figure 6:
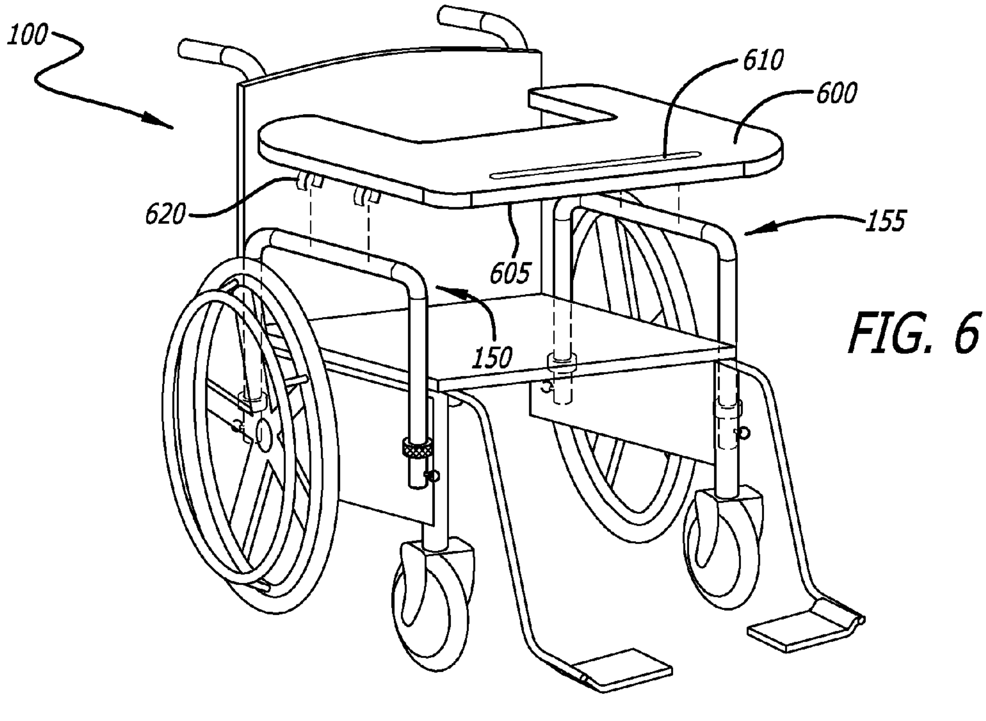
FIG. 6 is an exemplary embodiment of the customized wheelchair featuring a removable desk.

Referring to FIG. 6, an exemplary embodiment of the customized wheelchair 100 featuring a removable desk 600 is shown. According to this embodiment of the invention, desk 600 is sized with a width exceeding the distance between armrest 150 and 155. Desk 600 comprises a slot 610 to maintain pencils, pens or other writing instruments. Clips 620 are positioned on the bottom surface 605 of desk for mating with portions of armrest 150 and 155.

In the foregoing description, the invention is described with reference to specific exemplary embodiments thereof. It will, however, be evident that various modifications and changes may be made thereto without departing from the broader spirit and scope of the present invention as set forth in the appended claims. For instance, the clips may be substituted with another type of securing element. Hence, the specification and drawings are accordingly to be regarded in an illustrative rather than in a restrictive sense.

What is claimed is:

1. A wheelchair comprising:

a frame;

a seat mechanism coupled to the frame, the seat mechanism including a backrest and a seat;

a pair of vertically adjustable armrests coupled to the frame, at least a first armrest of the pair of adjustable armrests comprises (i) an armrest pad and (ii) an arm portion located between the backrest and a front edge of the seat, the arm portion comprises a first tubular segment arranged in a vertical direction and positioned in front of the backrest, a second tubular segment arranged in the vertical direction and positioned behind the front edge of the seat, a first post adapted to partially reside within the first tubular segment and within a first receiver coupled to the frame, a second post adapted to partially reside within the second tubular segment and within a second receiver coupled to the frame, and a horizontal tubular segment interposed between and coupled to the first tubular segment and the second tubular segment onto which the armrest pad is removably attached, the horizontal tubular segment is adapted to be (i) maintained at a first predetermined height when placed in a first operating state and (ii) maintained at a second predetermined height higher than the first predetermined height when placed in a second operating state; and an accessory that is removably coupled to the horizontal tubular segment of the first armrest once the armrest pad is detached and completely removed from the horizontal tubular segment.

2. The wheelchair of claim 1, wherein the accessory is a desk.

3. The wheelchair of claim 1, wherein the accessory is a cup-holder being a dedicated cylindrical element having a clip sized for attachment to the horizontal tubular segment of the arm portion.

4. The wheelchair of claim 1, wherein the accessory is a reading light.

5. The wheelchair of claim 1, wherein the accessory is a basket adapted for coupling to the horizontal tubular segment of the first armrest.

6. The wheelchair of claim 1, wherein the accessory includes at least one clip sized to mate with the horizontal tubular segment of the first armrest of the pair of vertically adjustable armrests.

7. The wheelchair of claim 1, wherein the accessory includes at least one securing element sized to mate with the horizontal tubular segment of the first armrest of the pair of adjustable armrests.

8. The wheelchair of claim 1, wherein the first armrest further comprises a first fastener to set a position of the first post within the first tubular segment and a second fastener different than the first fastener to set a position of the second post within the second tubular segment.

9. The wheelchair of claim 1, wherein each of the pair of vertically adjustable armrests further comprises the armrest pad being fully detachable from the horizontal tubular segment and, when attached, the armrest pad extending along the horizontal tubular segment.

10. The wheelchair of claim 1, wherein the armrest pad includes one or more clips situated on a bottom surface of the armrest pad, the one or more clips are sized to mate with the horizontal tubular segment and allow for complete removability of the armrest pad.

11. A method comprising:

removing an armrest pad completely from a horizontal tubular segment of an armrest for a wheelchair, the armrest comprises a first vertical tubular segment, a second vertical tubular segment and the horizontal tubular segment coupled to both the first vertical tubular segment and the second vertical tubular segment, the horizontal tubular segment being positioned between a backrest of the wheelchair and a front edge of a seat cushion of the wheelchair;

adjusting a height of the horizontal tubular segment in relation to the seat cushion; and coupling an accessory to the horizontal tubular segment of the armrest previously covered by the armrest pad.

12. The method of claim 11, wherein the accessory is a desk that is coupled to the horizontal tubular segment.

13. The method of claim 11, wherein the accessory is a cup-holder being a cylindrical unit that comprises a closed bottom end with a coupling element positioned on an outer surface of the bottom end, the coupling element is adapted for coupling to the horizontal tubular segment upon removal of the armrest pad.

14. The method of claim 11, wherein the accessory is a reading light.

15. The method of claim 11, wherein the accessory is a basket including a plurality of clips sized and positioned for attachment to the horizontal tubular segment upon removal of the armrest pad.

16. The method of claim 11, wherein the coupling of the accessory to the horizontal tubular segment comprises attaching at least one clip of the accessory so that the at least one clip partially circumscribes a curved outer surface of the horizontal tubular segment.

17. The method of claim 11, wherein the removing of the armrest pad completely from the horizontal tubular segment comprises detaching at least one clip of the armrest pad from the horizontal tubular segment.

18. A wheelchair comprising:

a frame including a backrest and a seat;

a pair of vertically adjustable armrests removably coupled to the frame and positioned in front of the backrest and behind a front edge of the seat, at least a first armrest of the pair of adjustable armrests comprises an arm portion including (i) a first post partially residing within a first receiver coupled to the frame, (ii) a first tubular segment into which the first post partially resides, (iii) a first fastener to control a positioning of the first post within the first tubular segment, (iv) a second post partially residing within a second receiver coupled to the frame, (v) a second tubular segment into which the second post partially resides, (vi) a second fastener to control positioning of the second post within the second tubular segment, and (vii) a horizontal tubular segment coupled to the first tubular segment and the second tubular segment, the horizontal tubular segment being adapted to be (1) maintained at a first predetermined height when placed in a first operating state by setting the first post to extend from the first tubular segment and the second post to extend from the second tubular segment by a first distance and (2) maintained at a second predetermined height when placed in a second operating state by setting the first post to extend from the first tubular segment and the second post to extend from the second tubular segment by a second distance greater than the first distance, and an armrest pad including one or more clips mounted on a bottom surface of the armrest pad to allow the armrest pad to be attached to the horizontal tubular segment and to be completely detached from the horizontal tubular segment.

19. The wheelchair of claim 18 further comprising:

an accessory that is removably coupled to the horizontal tubular segment of the first armrest of the pair of adjustable armrests once the armrest pad is detached and completely removed from the horizontal tubular segment.

* * * * *